(12) United States Patent
Abraham et al.

(10) Patent No.: US 10,785,711 B2
(45) Date of Patent: Sep. 22, 2020

(54) MOBILE TERMINAL AND NETWORK ACCESS METHOD FOR MOBILE TERMINAL ROAMING SERVICE

(71) Applicant: LG ELECTRONICS INC., Seoul (KR)

(72) Inventors: Aby Kanneath Abraham, Bangalore (IN); Rohit Gupta, Bangalore (IN)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/468,581

(22) PCT Filed: Dec. 12, 2016

(86) PCT No.: PCT/KR2016/014554
§ 371 (c)(1),
(2) Date: Jun. 11, 2019

(87) PCT Pub. No.: WO2018/110719
PCT Pub. Date: Jun. 21, 2018

(65) Prior Publication Data
US 2020/0092798 A1    Mar. 19, 2020

(51) Int. Cl.
*H04W 48/16* (2009.01)
*H04W 48/18* (2009.01)
(Continued)

(52) U.S. Cl.
CPC ............ *H04W 48/16* (2013.01); *H04W 8/02* (2013.01); *H04W 8/183* (2013.01); *H04W 48/18* (2013.01); *H04W 88/06* (2013.01); *H04W 84/042* (2013.01)

(58) Field of Classification Search
CPC ..... H04W 48/16; H04W 88/06; H04W 8/183; H04W 48/18; H04W 8/02; H04W 84/042
(Continued)

(56) References Cited

U.S. PATENT DOCUMENTS

2010/0216439 A1*  8/2010  Marcelli ............... H04M 15/00
                                                            455/414.1
2014/0179258 A1*  6/2014  Arzelier ................. H04W 4/90
                                                            455/404.1
(Continued)

FOREIGN PATENT DOCUMENTS

EP              1819184 A    8/2007
KR    10-2007-0081778 A    8/2007
(Continued)

*Primary Examiner* — Inder P Mehra
(74) *Attorney, Agent, or Firm* — Birch, Stewart, Kolasch & Birch, LLP

(57) ABSTRACT

A mobile terminal and a network access method for a mobile terminal roaming service are disclosed. The mobile terminal according to the present invention comprises a control unit for: identifying a roaming area/country corresponding to a current location of a terminal body, on the basis of information included in PLMNs searched for in the terminal body, in response to the detection of a total failure in searching of the terminal body, a wireless communication unit, a lastly registered PLMN, a home PLMN, and PLMNs stored in a SIM; and controlling the wireless communication unit so as to connect to one of PLMNs having been successfully camped in the identified roaming area/country.

12 Claims, 8 Drawing Sheets

(51) Int. Cl.
*H04W 88/06* (2009.01)
*H04W 8/18* (2009.01)
*H04W 8/02* (2009.01)
*H04W 84/04* (2009.01)

(58) Field of Classification Search
USPC ...................................................... 455/432.1
See application file for complete search history.

(56) References Cited

U.S. PATENT DOCUMENTS

| | | | | |
|---|---|---|---|---|
| 2014/0295830 A1* | 10/2014 | Oerton | .................. | H04W 88/04 |
| | | | | 455/426.1 |
| 2014/0357263 A1* | 12/2014 | Vallurupalli | .......... | H04W 48/18 |
| | | | | 455/432.1 |
| 2014/0357271 A1* | 12/2014 | Edara | ................ | H04W 52/0254 |
| | | | | 455/434 |
| 2015/0126187 A1* | 5/2015 | Ponukumati | .......... | H04W 72/02 |
| | | | | 455/434 |

FOREIGN PATENT DOCUMENTS

| | | |
|---|---|---|
| KR | 10-2008-0014551 A | 2/2008 |
| KR | 10-0845314 B1 | 7/2008 |
| KR | 10-2009-0101619 A | 9/2009 |
| KR | 10-2012-0114360 A | 10/2012 |
| WO | WO 2015/009069 A1 | 1/2015 |

* cited by examiner

MOBILE TERMINAL AND NETWORK ACCESS METHOD FOR MOBILE TERMINAL ROAMING SERVICE

CROSS REFERENCE TO RELATED APPLICATIONS

This application is the National Phase of PCT International Application No. PCT/KR2016/014554, filed on Dec. 12, 2016, which is hereby expressly incorporated by reference into the present application.

TECHNICAL FIELD

The present invention relates to a mobile terminal accessible to a network and a network access method for a mobile terminal roaming service.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

In addition, such a terminal can provide a variety of services by accessing to a wireless network. Here, the wireless network refers to a system of interoperable components supporting one or more wireless communication services between two or more devices. Under certain circumstances, limited resources in the wireless network may limit the number of terminals and/or service quality of terminals seeking access to a wireless communication service.

Meanwhile, a mobile communication provider provides a roaming service to a mobile terminal user. The roaming service refers to a service that allows a mobile terminal to get access to a wireless network of another mobile communication provider even when out of its normal coverage area of the subscribed mobile communication provider.

When a mobile terminal moves from a current network to another network, public land mobile network (PLMN) searching and registering procedures for a roaming service are required. In the related art, PLMN searching is performed by repeating procedures of sequentially acquiring PLMN identification information for all received frequencies until a PLMN available for registering on a base station is acquired and registering the acquired PLMN. This is not only time consuming but also increasing battery current consumption due to the network searching. A longer PLMN searching period may resulted in an extended mobile communication service disconnection time or an unnecessary roaming charge due to a delay in switching to a home network. On the other hand, a shorter PLMN searching period may result in faster battery consumption.

DETAILED DESCRIPTION OF THE DISCLOSURE

Thus, one aspect of the present invention is to provide a mobile terminal capable of quickly searching for a PLMN for roaming while reducing battery consumption, and a network access method for a mobile terminal roaming service.

In order to achieve this aspect of the present invention, there is provided a network access method for a mobile terminal roaming service, the method including detecting all failed searches for a last registered PLMN, a home PLMN, and PLMNs stored on a Subscriber Identification Module (SIM), identifying a roaming area/country corresponding to a current location of a mobile terminal based on information included in PLMNs searched for in a terminal body, and performing roaming by accessing to one of successfully camped on PLMNs in the identified roaming area/country.

In one embodiment of the present invention, the information included in the PLMNs retrieved in the terminal body may be at least one of a Mobile Country Code (MCC) and a Mobile Network Code (MNC).

In one embodiment of the present invention, the network access method for a mobile terminal roaming service may further include checking whether there is a previously camped on PLMN in the identified roaming area/country, and trying to camp on the corresponding PLMN.

In one embodiment of the present invention, the network access method for a mobile terminal roaming service may further include determining a Radio Access Technology (RAT) for camping based on an optimal RAT previously used when successfully being camped on the PLMN in the identified roaming area/country upon trying to camp on.

In one embodiment of the present invention, the network access method for a mobile terminal roaming service may further include determining a PLMN to camp on based on a fixed list stored in the terminal body when the last registered PLMN in the identified roaming area/country is unavailable.

In one embodiment of the present invention, the network access method for a mobile terminal roaming service may further include trying to sequentially camping on PLMNs from a PLMN having the strongest signal strength among the PLMNs searched for in the terminal body when the PLMN determined based on the fixed stored list is unavailable.

In one embodiment of the present invention, the network access method for a mobile terminal roaming service may further include automatically registering the corresponding PLMN as a preferred PLMN in the identified roaming area/country upon successfully camping on the last registered PLMN in the identified roaming area/country.

In one embodiment of the present invention, the network access method for a mobile terminal roaming service may include checking a list of PLMNs approved for a home PLMN in the identified roaming area/country, and attempting to camp on according to a period stored on the SIM using the checked list of PLMNs when the last registered PLMN in the identified roaming area/country is unavailable In order to achieve this aspect of the present invention, there is also provided a mobile terminal, including a terminal body, a wireless communication unit, and a control unit (controller) configured to control the wireless communication unit to identify a roaming area/country corresponding to a current location of the terminal body based on information included in PLMNs retrieved in the terminal body in response to all failed searches for a last registered PLMN, a home PLMN, and PLMNs stored on a Subscriber Identification Module (SIM) so as to access to one of successfully camped on PLMNs of the identified roaming area/country.

In one embodiment of the present invention, the information included in the PLMNs retrieved in the terminal body may be at least one of a Mobile Country Code (MCC) and a Mobile Network Code (MNC).

In one embodiment of the present invention, the controller may control the wireless communication unit to check whether there is a previously camped on PLMN in the identified roaming area/country and try to camp on the corresponding PLMN.

In one embodiment of the present invention, the controller may determine a Radio Access Technology (RAT) for camping based on an optimal RAT previously used when successfully camped on the PLMN in the identified roaming area/country upon making the camp-on attempt.

In one embodiment, the controller may determine a PLMN to camp on based on a fixed list stored in the terminal body when the last registered PLMN in the identified roaming area/country is unavailable.

In one embodiment of the present invention, the controller may sequentially camp on PLMNs from a PLMN having the strongest signal strength among PLMNs searched for in the terminal body when the PLMN determined based on the fixed stored list is unavailable.

EFFECTS OF THE DISCLOSURE

In a mobile terminal and its control method according to an embodiment of the present invention, a time to search for and camp on a PLMN for a roaming service can be reduced. In addition, battery consumption for network searching can be further reduced by quickly searching for and camping on a suitable PLMN providing a roaming service.

BEST MODE OF THE DISCLOSURE

Figure 1A:
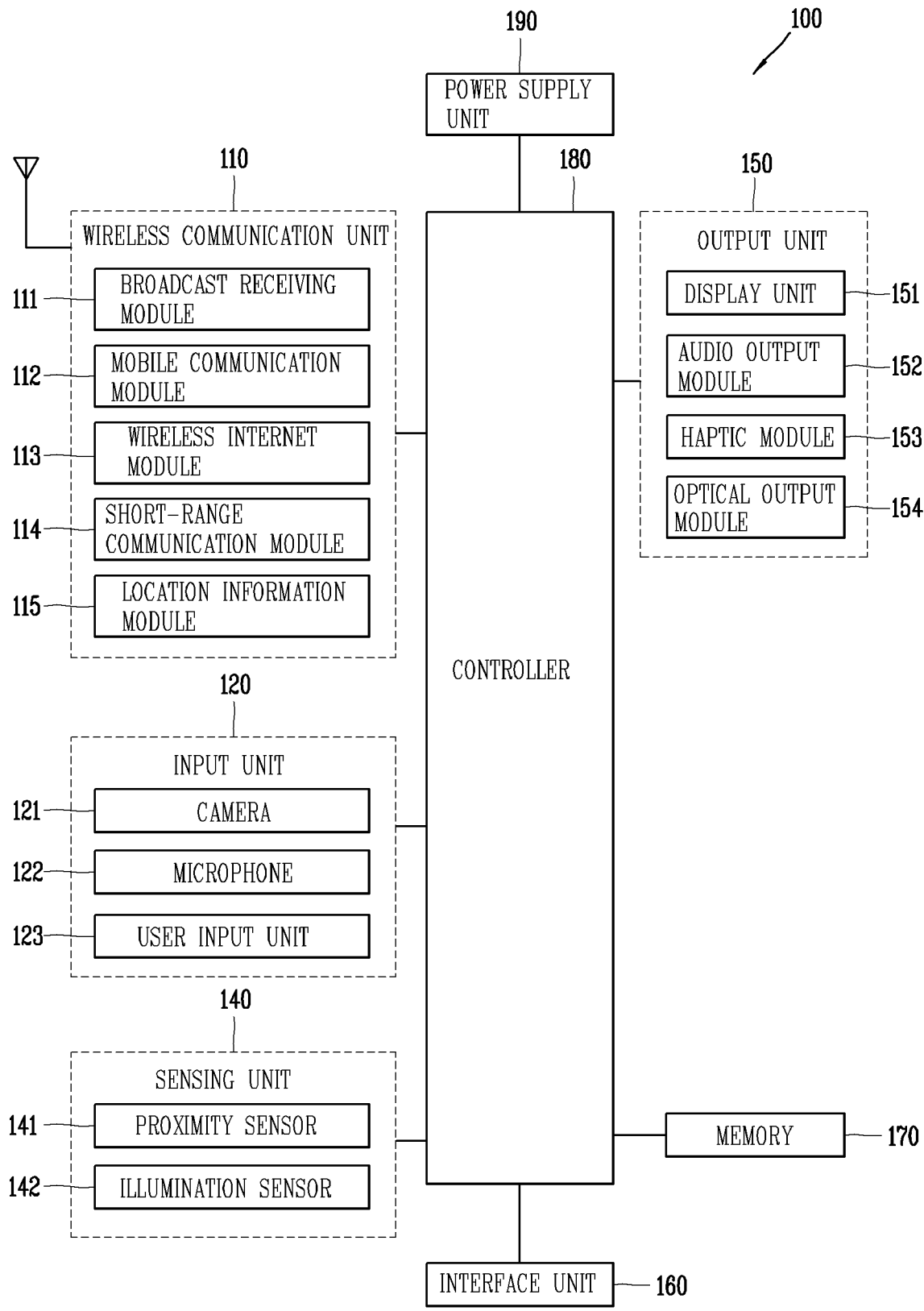
FIG. 1A is a block diagram of a mobile terminal according to one embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
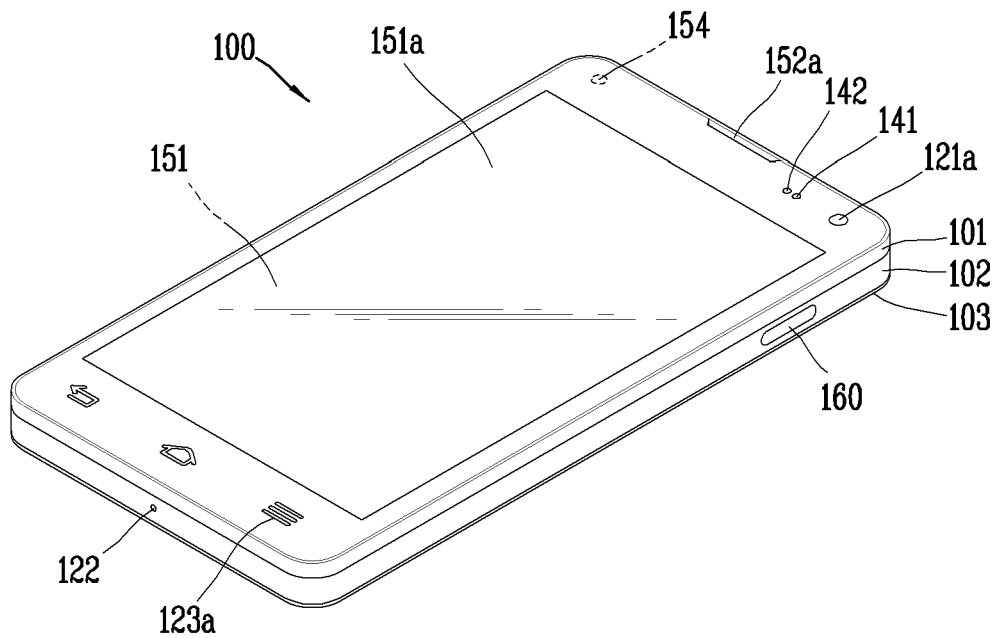
FIGS. 1B and 1C are perspective views illustrating one example of a mobile terminal according to the present invention, viewed from different directions.
Figure 1C:
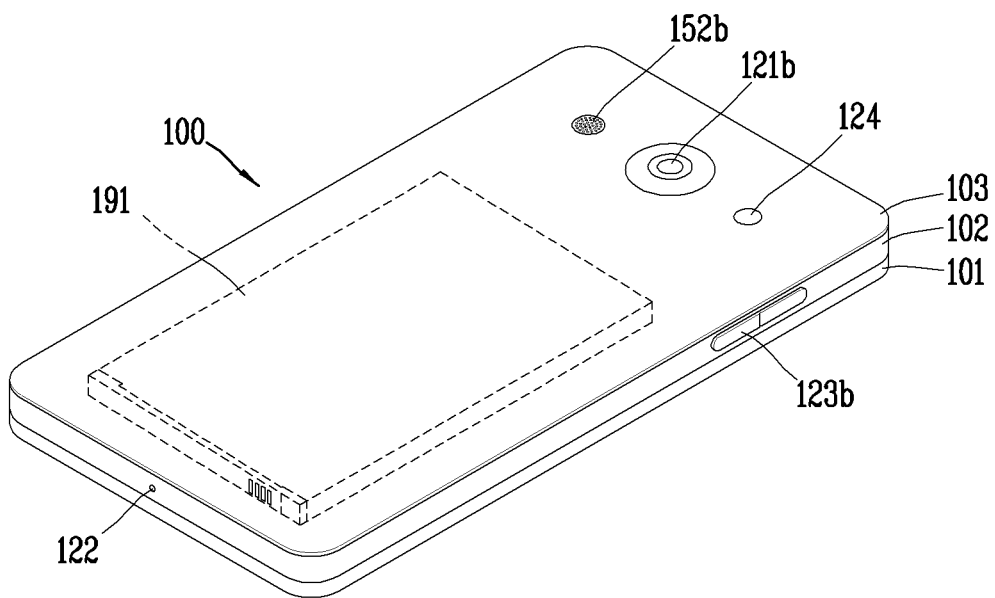

Referring to FIGS. 1A to 1C, FIG. 1A is a block diagram of a mobile terminal in accordance with one exemplary embodiment of the present invention, and FIGS. 1B and 10 are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like.

In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG.

1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2A:
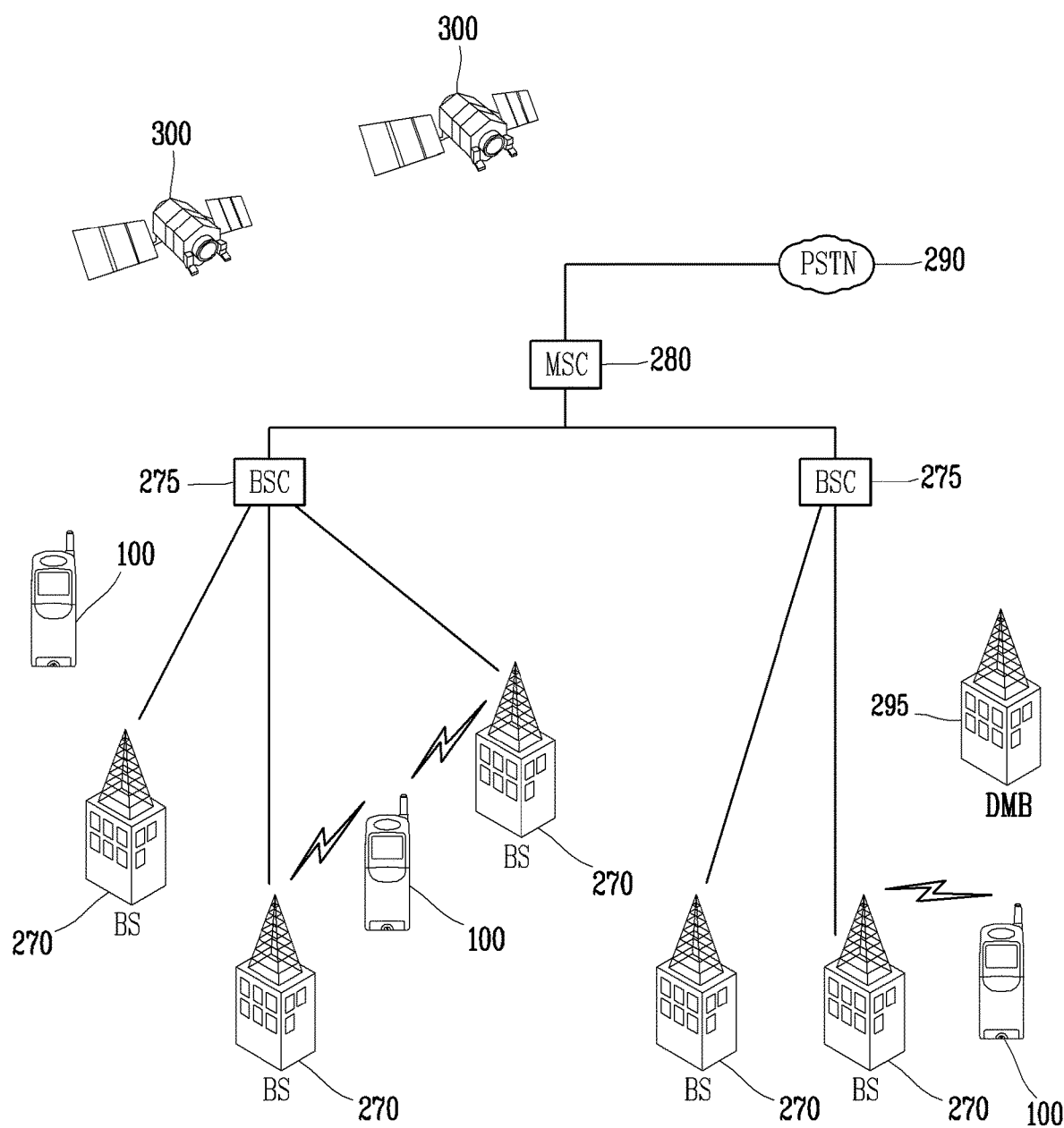
FIG. 2A is an exemplary view illustrating a wireless communication system of a mobile terminal according to the present invention.

In addition, a mobile terminal 100 according to the present invention may use different radio interfaces and/or physical layers for a communication system. FIG. 2A illustrates an example of a wireless communication system of a mobile terminal according to the present invention.

Wireless interfaces that can be used by the communication system may include Frequency Division Multiple Access (FDMA), Time Division Multiple Access (TDMA), Code Division Multiple Access (CDMA), Universal Mobile Telecommunications Systems (UMTS) (especially, Long Term Evolution (LTE)), Global system for Mobile Communications (GSM), and the like.

Hereinafter, for the convenience of explanation, the description will be limited to CDMA. However, it is apparent that the present invention can be applied to all communication systems including a CDMA wireless communication system.

The CDMA wireless communication system includes at least one mobile terminal 100, at least one Base Station (BS), at least one of Base Station Controllers (BSCs), and a Mobile Switching Center (MSC). The MSC is configured to be connected to a Public Switched Telephone Network (PSTN) and the BSCs. The BSCs may be paired with the BS via a backhaul line. The backhaul line may be provided according to at least one of E1/T1, ATM, IP, PPP, frame relay, HDSL, ADSL or xDSL. Thus, a plurality of BSCs 275 may be included in the system illustrated in FIG. 2A.

Each of the plurality of BSs may include at least one sector, and each sector may include an omnidirectional antenna or an antenna pointing to a particular radial direction from the BS. In addition, each sector may include two or more antennas of various forms. Each BS may be configured to support a plurality of frequency assignments, and each of the plurality of frequency assignments may have a specific spectrum (e.g., 1.25 MHz, 5 MHz, etc.).

An intersection of sector and frequency assignment may be referred to as a CDMA channel. The BS may be referred to as a Base Station Transceiver Subsystem (BTSs). In this case, a combination of one BSC and at least one BS may be referred to as a "base station". The base station may also indicate a "cell site". Alternatively, each of the plurality of sectors for a particular BS may be referred to as a plurality of cell sites.

The BS receives a reverse link signal from the mobile terminal 100 during a typical operation of the wireless communication system. At this time, the mobile terminal 100 is connecting a call, transmitting or receiving a message, or performing another communication operation. Each of the reverse link signals received by a particular base station is processed by a particular base station. The resultant data is transmitted to the connected BSCs. The BSCs provide call resource allocation and mobility management functions including organization of soft handoffs between base stations. The BSCs also transmit the received data to the MSC, which provides an additional transmission service for connection to the PSTN. Similarly, the PSTN may be connected to the MSC, the MSC may be connected to the BSCs, and the BSCs may control the BS such that a forward link signal is transmitted to the mobile terminal 100.

Next, a method for acquiring information of a mobile terminal location using a Wi-Fi (Wireless Fidelity) Positioning System (WPS: Wi-Fi Positioning System) will be described.

The WPS refers to a positioning technology based on a Wireless Local Area Network (WLAN) using Wi-Fi for tracking a location of the mobile terminal 100 using a Wi-Fi module provided in the mobile terminal 100 and a wireless Access Point (AP) for transmitting or receiving to and from the Wi-Fi module and radio (wireless) signals.

The WPS may include a Wi-Fi positioning server, a mobile terminal 100, a wireless AP connected to the mobile terminal, and a database in which certain wireless AP information is stored.

The Wi-Fi positioning server extracts information of the wireless AP connected to the mobile terminal 100 based on a location information request message (or signal) of the mobile terminal 100. The information of the wireless AP connected to the mobile terminal 100 may be transmitted to the Wi-Fi positioning server via the mobile terminal 100 or may be transmitted to the Wi-Fi positioning server from the wireless AP.

The information of the wireless AP extracted based on the location information request message (or signal) of the mobile terminal 100 may include at least one of MAC address, SSID, RSSI, channel information, privacy, network type, signal strength, and noise strength.

The Wi-Fi positioning server, as described above, receives the information of the wireless AP connected to the mobile terminal 100 and compares information included in a built-in (pre-established) database with the received wireless AP information to extract (or analyze) location information of the mobile terminal 100.

Next, a database stored in arbitrary wireless AP information will be described in more detail. Various information of arbitrary wireless APs located at different locations may be stored in the database.

The information of arbitrary wireless APs stored in the database may include at least one of MAC address, SSID, RSSI, channel information, privacy, network type, latitude and longitude coordinates of the wireless AP, building name at which the wireless AP is located, floor number, detailed information of indoor location (GPS coordinates available), AP owner's address, telephone number, and the like.

In this manner, since arbitrary wireless AP information and location information corresponding to the arbitrary wireless AP are stored together in the database, the Wi-Fi positioning server may search for a wireless AP information corresponding to the information of the wireless AP connected to the mobile terminal 100 in the database to extract the location information matched to the searched wireless AP information, thereby extracting the location information of the mobile terminal 100.

The extracted location information of the mobile terminal 100 is transmitted to the mobile terminal 100 via the Wi-Fi positioning server, thereby acquiring the location information of the mobile terminal 100.

Figure 2B:
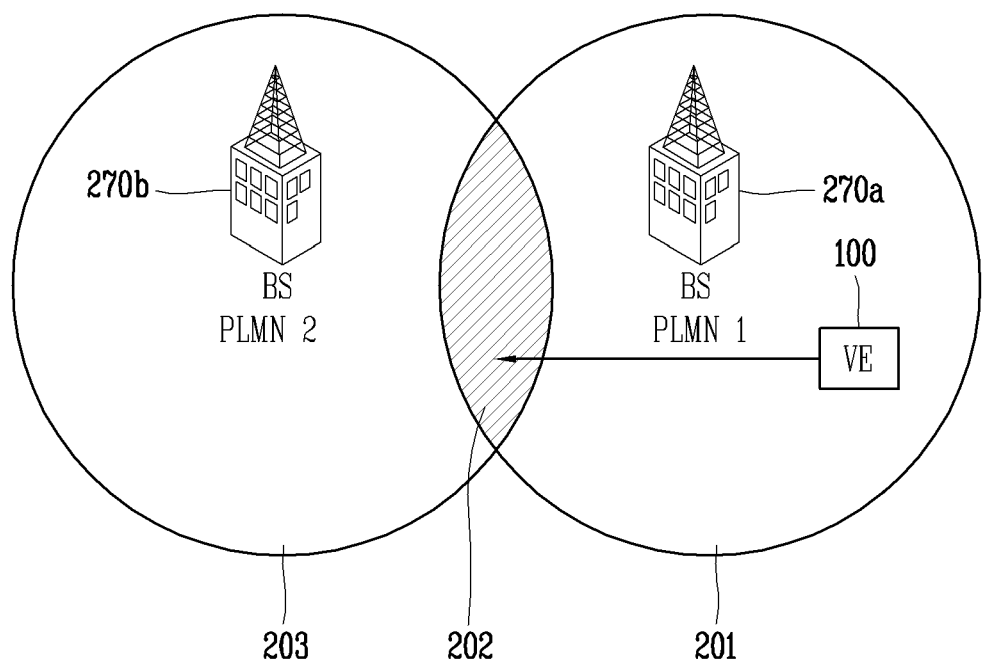
FIG. 2B is an exemplary view illustrating a roaming process of a mobile terminal according to the present invention.

Next, FIG. 2B illustrates a roaming process of a mobile terminal according to the present invention.

The roaming process of the mobile terminal (UE) 100 will be described with reference to FIG. 2B. When the mobile terminal 100 is out of a service area 201 of a BS (e.g., a home base station) 270a of a PLMN 1, and enters a service area 203 of a BS (e.g., a visited base station) 270b of a PLMN 2, roaming in the visited base station 270b is available through a location registration. Here, the PLMN 1 may be a home network or a preferred network, and the PLMN 2 may be a visited network or a non-preferred network. The PLMN 1 and the PLMN 2 may have an overlapping roaming (coverage) area 202 and may roam in the visited base station 270b of the overlapping roaming area 202.

The mobile terminal 100 searches for a home PLMN at every predetermined period stored on its SIM after the roaming is completed. When the mobile terminal 100 moves into the service area 201 of the home base station 270a, it may be camped on the home station 270a of the PLMN 1 again. In order for this, the mobile terminal 100 may include a plurality of different network search periods. For instance, different search methods may be applied in response to an expiration of a first search period and an expiration of a second search period. As one example, when the first search period expires, frequencies included in a stored list of frequencies are only scanned to search for the network, and when the second search period expires, all frequencies around the mobile terminal are fully scanned (full scan) to search for the network.

Meanwhile, in the present invention, a network searching method for a fast roaming service is provided for when the mobile terminal 100 moves to a non-service area, when re-entering a home network service area after roaming to the PLMN 2, or when finding a PLMN providing a roaming service is not available. In more detail, in the present invention, when the mobile terminal 100 failed to search for the last registered PLMN, home PLMN, and PLMN stored on its SIM, it may identify a roaming area/country corresponding to a current location based on information (e.g., MCC, MNC information) included in the currently searched PLMNs. In addition, roaming without interruption may be available by accessing to one of the successfully camped PLMNs in the identified roaming area/country. Accordingly, battery consumption for network searching can be further reduced as time required to search for and camp on the PLMN for the roaming service is reduced.

Figure 3:
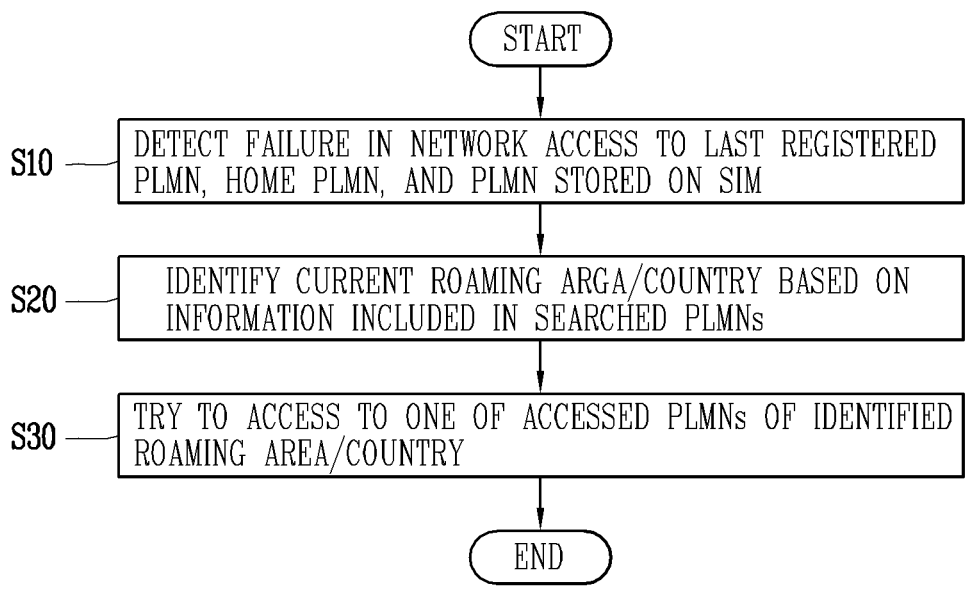
FIG. 3 is a representative flowchart illustrating an operation of searching for an accessible network upon roaming, in a mobile terminal according to the present invention.

FIG. 3 is a flowchart illustrating an operation of searching for an accessible network for a roaming service according to an embodiment of the present invention.

Referring to FIG. 3, when the mobile terminal 100 is powered on, a flight mode is on/off, and entering a service area from a non-service area, the controller 180 of the mobile terminal 100 searches for the last registered PLMN, home PLMN, and PLMNs stored on the SIM for using the service. After searching, if any one of the PLMNs is found, location registration is tried to camp on. When camped on the PLMN, a mobile communication service may be provided.

Meanwhile, all failed searches for the last registered PLMN, home PLMN, and PLMNs stored on the SIM may be detected (S10). For example, when the mobile terminal 100 enters the non-service area or enters a heterogeneous network due to movement of the mobile terminal 100 moving, the mobile communication service is disconnected. Accordingly, network searching is required to roam again. At this time, when searching for the last registered PLMN, home PLMN, and PLMN stored on the SIM all failed, the PLMN may be quickly searched through the following processes.

Specifically, the controller 180 of the mobile terminal 100 identifies a roaming area/country corresponding to a current position of the terminal based on information such as MCC and/or MNC included in PLMNs found in the terminal body (S20). That is, the roaming area/country corresponding to the current location is first identified without using a random manner or repeatedly attempting to camp on all scanned PLMNs based on signal strength. Specifically, MCC/MNC information of PLMNs (any PLMNs) found in the corresponding area may be used to easily identify the roaming area/country. For example, the MCC of the detected PLMNs is compared with the MCC of the last registered PLMN. When they are not matched with each other, it is recognized as international roaming, and information is received from a base station of a neighboring cell to identify the roaming country/area corresponding to the MCC first.

Next, the controller 180 may control the wireless communication unit 110 to perform roaming by connecting to one of the successfully camped PLMNs in the identified roaming area/country (S30). Specifically, the controller 180 checks whether there is a successfully camped on PLMN of the identified roaming area/country before, and tries to camp on the confirmed PLMN first.

Accordingly, time required to search for and camp on the PLMN for the roaming service is reduced. In addition, as searching for and camping on a suitable PLMN providing the roaming service are done quickly, battery consumption for network searching is further reduced.

Figure 4:
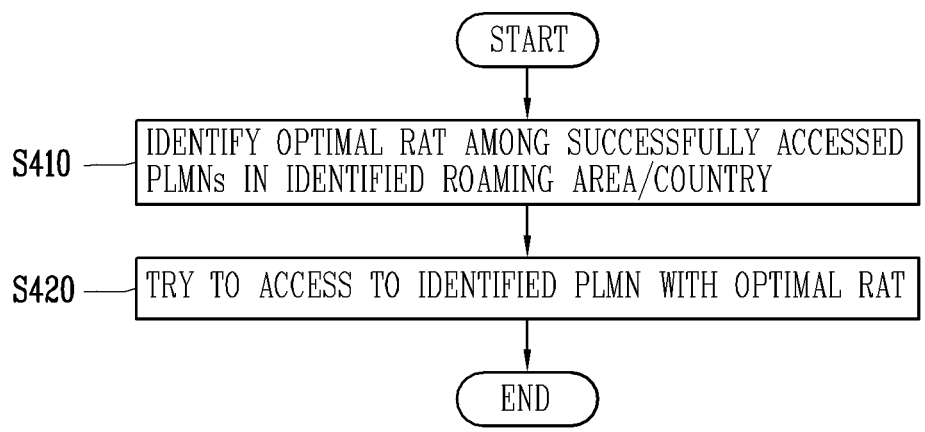
FIG. 4 is an exemplary flowchart illustrating an operation of determining a Radio Access Technology (RAT) for accessing to a network of a roaming country/area, in a mobile terminal according to the present invention.

Next, FIG. 4 illustrates an operation regarding a radio access technology (RAT) used for accessing to a network of a roaming country/area, in a mobile terminal according to the present invention.

First, when the controller 180 of the mobile terminal 100 detects all failed in searches for the last registered PLMN, home PLMN, and PLMNs stored on the SIM, it uses an MCC and/or MNC included in searched PLMNs to identify a roaming area/country corresponding to a current location.

Next, the controller 180 checks whether there is a previously camped on PLMN of the identified roaming area/country, and then identifies an optimal RAT previously used for successfully camping on the PLMN of the identified roaming area/country when trying to camp on the corresponding PLMN (S410).

Next, the controller 180 may attempt to camp on the previously registered PLMN of the identified roaming area/country by using the identified optimal RAT (S420). When successfully camped on the corresponding PLMN, a mobile communication service is provided via a base station of the corresponding PLMN.

Meanwhile, in one embodiment of the present invention, as the camp-on attempt is successful, a home PLMN may be searched at every predetermined period if the previously registered PLMN is not the home PLMN even after roaming of the mobile terminal 100 is completed. Accordingly, when the mobile terminal 100 moves back to the service area of the home PLMN, it can be immediately camped on the searched home PLMN so that roaming fees are not charged. For this, the controller 180 may include a plurality of different home PLMN search periods. For example, when the first search period expires, frequencies included in a prestored frequency list are only searched for the home PLMN, and when the second search period expires, all neighboring frequencies are fully scanned to search for the home PLMN.

In addition, in one embodiment of the present invention, cell overlapping information is obtained based on information transmitted from a base station of neighboring home PLMN so that the mobile terminal 100 is quickly registered on the home PLMN. Accordingly, even if there is another PLMN having a stronger signal but using the same frequency as of the home PLMN, the mobile terminal 100 may acquire the home PLMN from a frequency having the same frequency and a weaker signal without changing the frequency based on the acquired cell overlapping information.

Figure 5:
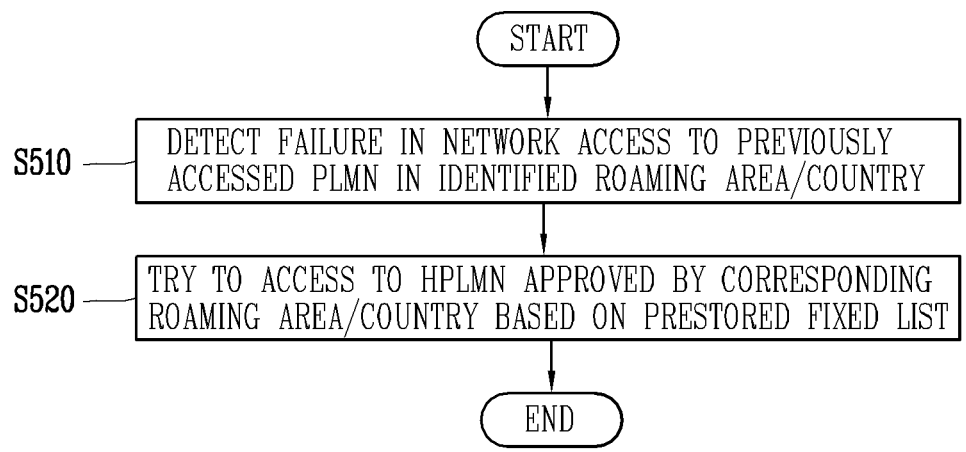
FIG. 5 is an exemplary flowchart illustrating an operation of searching for an accessible network when a last registered network of a roaming country/area is unavailable, in a mobile terminal according to the present invention.

FIG. 5 is an exemplary flowchart illustrating an operation of searching for an accessible network when the last registered network of the roaming country/area is not available, in a mobile terminal according to the present invention.

First, a roaming area/country are identified by using an MCC and/or MNC included in searched PLMNs, and a failure in access to the last camped on PLMN of the identified roaming area/country may be detected (S510).

Then, the controller 180 of the mobile terminal 100 determines a PLMN to camp on based on a prestored fixed list. Specifically, the controller 180 checks a home PLMN approved by the corresponding roaming area/country based on the prestored fixed list, and then tries to camp on the respective PLMN (S520).

Here, the fixed list may be a table including home PLMNs approved by all roaming countries/areas. For example, since an MCC of a home PLMN and an available PLMN for roaming vary depending on which country's service provider base station is used for the home PLMN by the user of the mobile terminal, the table may include a plurality of PLMNs information available for roaming according to each MCC/MNC of the home PMMN. In this case, the controller of the mobile terminal 100 may read the home PLMN approved by the roaming area/country identified in the roaming PLMN table stored on the SIM to camp on.

Figure 6:
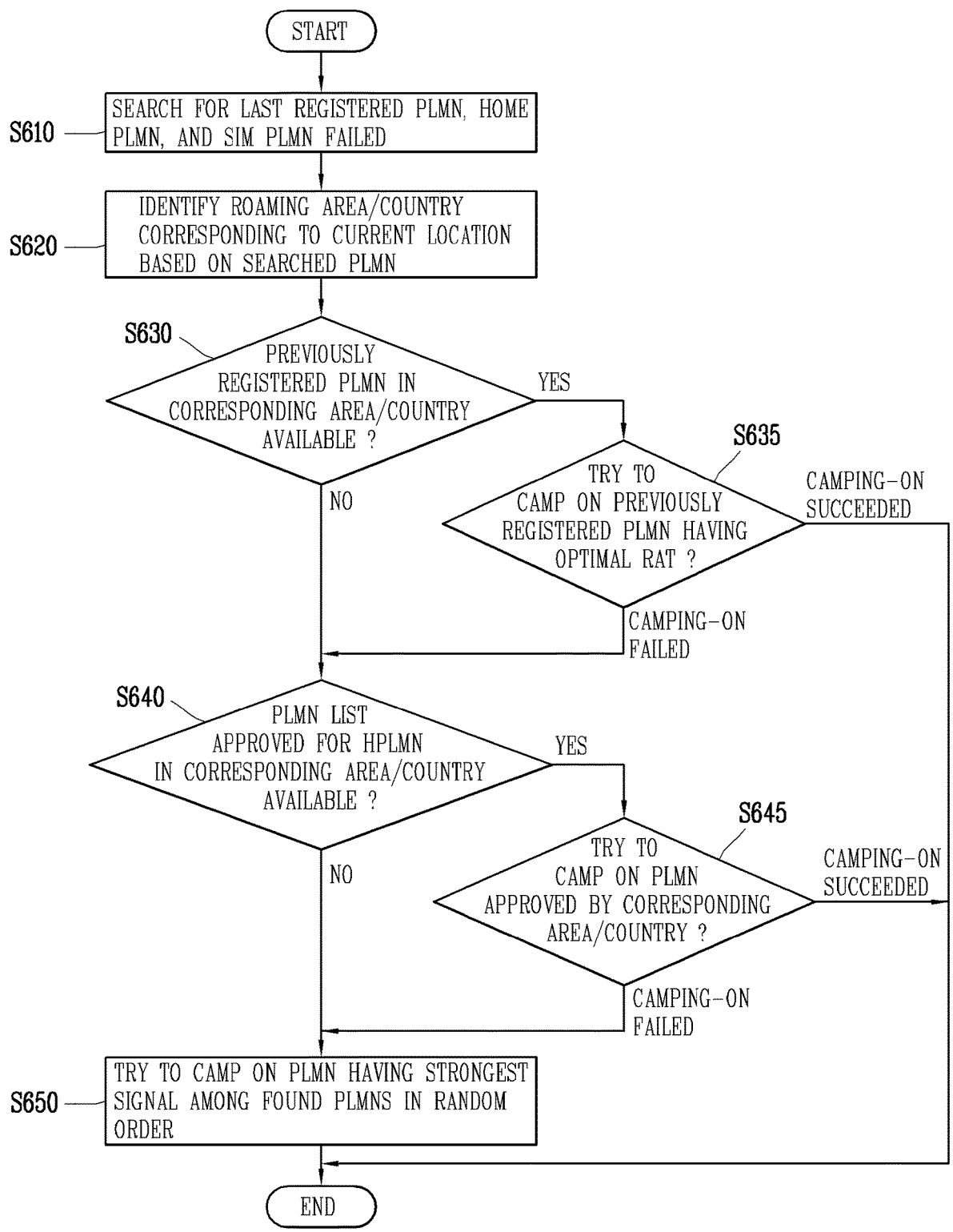
FIG. 6 is an overall flowchart illustrating an operation of searching for an accessible network to camp on upon roaming, in a mobile terminal according to the present invention.

FIG. 6 is a flowchart illustrating an entire process of an operation of searching for an accessible network to camp on upon roaming, in a mobile terminal according to the present invention.

Referring to FIG. 6, the mobile terminal 100 detects that searching for the last registered PLMN, home PLMN, and PLMNs stored on its SIM are all failed (S610). In this case, since the mobile communication service is interrupted, a suitable PLMN needs to be quickly searched. The mobile terminal 100 identifies a roaming area/country corresponding to a current location of the terminal by using information such as MCC/MNC included in the searched PLMN (S620). Then, it is determined whether the previously registered PLMN of the identified roaming area/country is available (S630). At this time, the home PLMN is determined whether it is an available PLMN.

In case the available PLMN in the corresponding roaming area/country is found from the determination result of the step S630, the mobile terminal 100 attempts to camp on the previously registered PLMN using an optimal RAT (S635). When the camp-on attempt succeeds, the mobile terminal 100 is camped on the corresponding PLMN so as to receive the mobile communication service. Then, the operation is ended. In one embodiment of the present invention, when successfully camped on the last registered PLMN of the identified roaming area/country, the corresponding PLMN may be automatically registered with a preferred PLMN of the identified roaming area/country. At this time, if the successfully camped on PLMN is the home PLMN, it is registered with a preferred network, and otherwise, it may not be automatically registered with the preferred network.

On the other hand, when a PLMN available in the corresponding roaming area/country is not found in the step S630 or when the camp-on attempt is failed in the step S635, it is determined whether a list of PLMNs approved for home PLMNs of the corresponding roaming area/country is available (S640).

When the list of PLMNs approved for the home PLMNs is determined as 'available' from the determination result of the step S640, the mobile terminal 100 tries to camp on the home PLMNs of the list (S645). Specifically, it tries to camp on according to a period stored on the SIM using the list of approved PLMNs. When the camp-on attempt succeeds, the mobile terminal 100 is camped on the corresponding PLMN so as to receive the mobile communication service. Then, the operation is ended. On the other hand, when the list of PLMNs approved for the home PLMNs is determined as 'unavailable' from the determination result of the step S640, or the camp-on attempt fails in the step S645, the mobile terminal 100 may try to camp on a PLMN having the strongest signal strength among the found PLMNs (S650). At this time also, when the found PLMN is not the home PLMN, the home PLMN may be searched at the predetermined period.

Figure 7A:
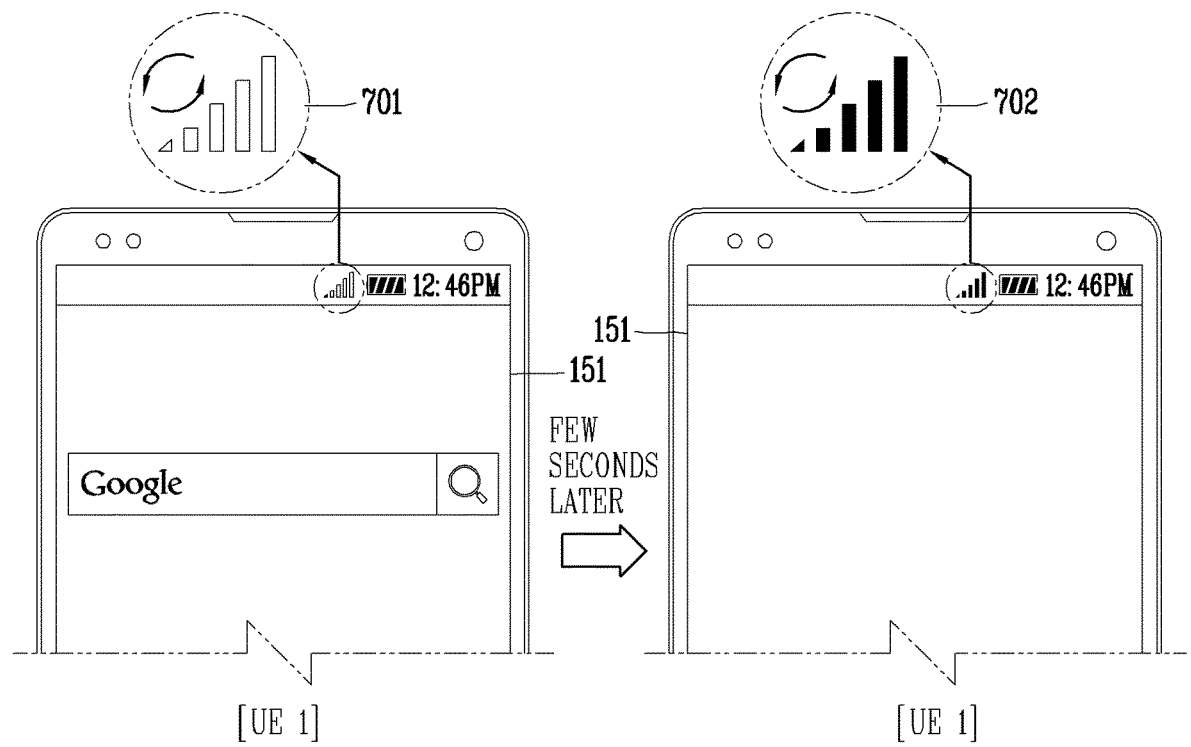
FIGS. 7A and 7B are views of comparing operations of a mobile terminal performing operations according to the present invention with those of the related art mobile terminal.
Figure 7B:
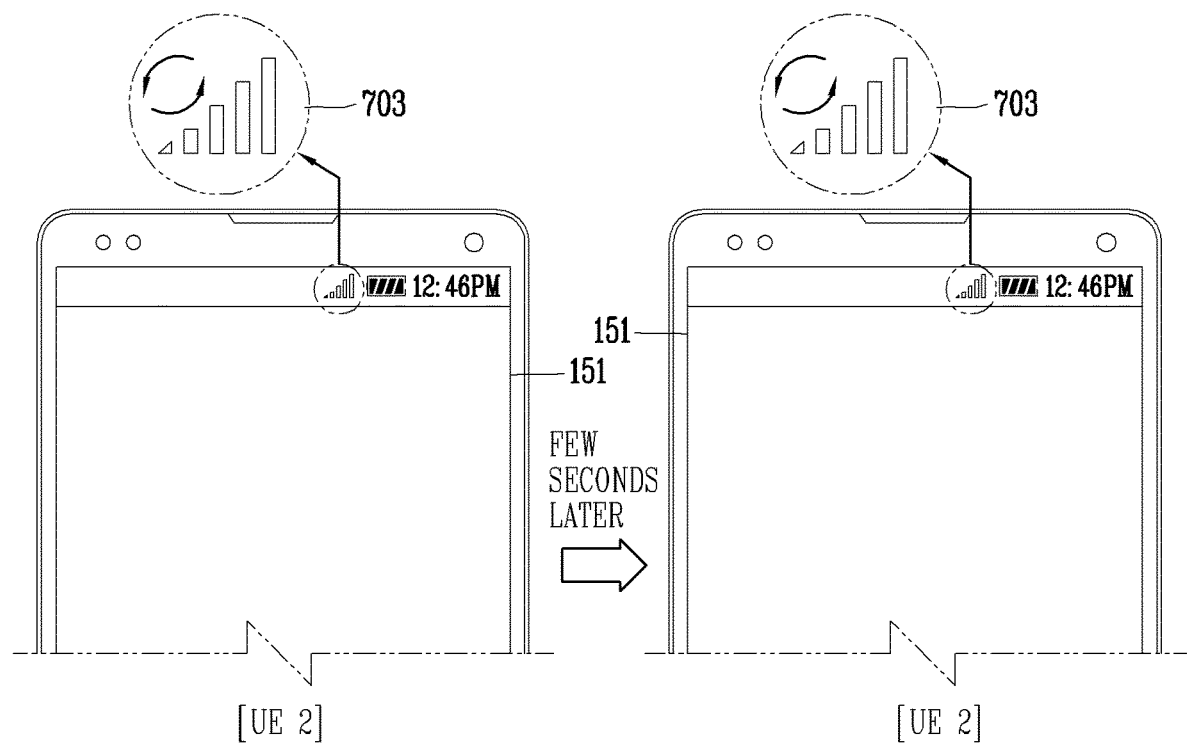

FIGS. 7A and 7B are views comparing operations of a mobile terminal employing a network search method according to the present invention with a mobile terminal using the related art network search method. FIG. 7A illustrates a display screen change according to a network search in a mobile terminal (UE 1) employing a network search method according to the present invention, and FIG. 7B illustrates a display screen change in a mobile terminal (UE 2) using the related art network search method.

For example, as shown in FIG. 7A, in a mobile terminal UE 1 employing a network searching method according to the present invention, a first roaming icon 701 indicating that the mobile communication service is disconnected is displayed on an upper bar of a display unit 151 as searching for a last registered PLMN, home PLMN, and PLMNs stored on a SIM have all failed. At this time, according to the network search method described in the present invention, after 2 to 5 seconds later, the mobile terminal camps on the PLMN available in the roaming area/country to receive the mobile communication service again. Accordingly, the first roaming icon 701 displayed on the upper bar of the display unit 151, as shown in the right side of FIG. 7A, is changed to a roaming icon 702 indicating that mobile communication service is available after about 2 to 5 seconds later. On the other hand, referring to FIG. 7B, in a mobile terminal UE 2 using the related art network search method, a first roaming icon 703 displayed on an upper bar of the display unit 151, which indicates that the mobile communication service is disconnected, is maintained even after a few seconds have passed as searching for the last registered PLMN, home PLMN, and PLMNs stored on the SIM have all failed. This is because camping on PLMNs available in the roaming area/country are continuously tried in a random manner. According to a test result, available PLMNs are searched to receive the mobile communication service about 15 to 20 seconds later.

Figure 8:
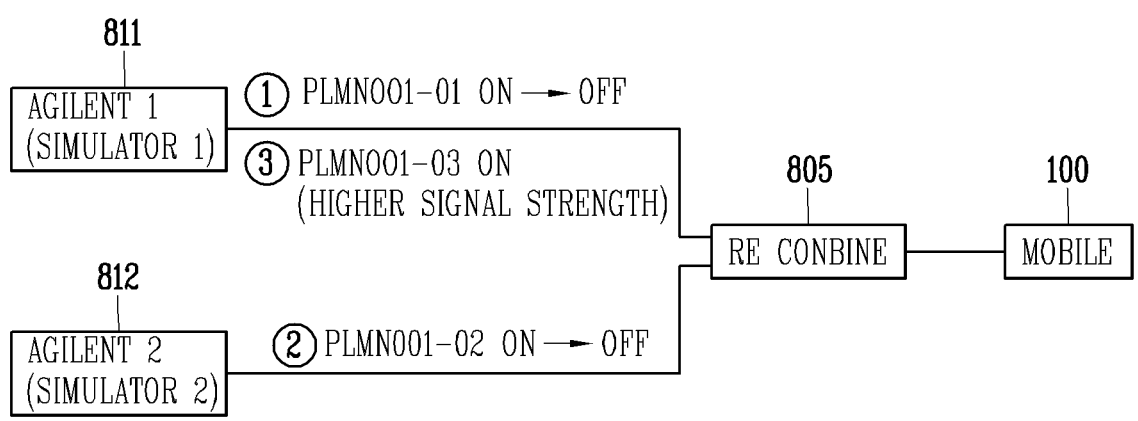
FIG. 8 is a view illustrating a simulation setting for detecting a case in which a network search method is applied to a mobile terminal according to the present invention.

FIG. 8 is a view illustrating a simulation setting for detecting a case in which a network search method is applied to a mobile terminal according to the present invention.

Referring to FIG. 8, in the simulation setting, an RF combiner 805 is connected to a user equipment (UE), that is, a mobile terminal 100, and heterogeneous network simulators, namely, a first simulator (Agilent 1) 811 and a second simulator (Agilent 2) 812 are connected to the RF combiner 805, respectively. At this time, the first simulator (Agilent 1) 811 and the second simulator (Agilent 2) 812 are not directly connected with each other. It is assumed that the mobile terminal 100 is moved to a roaming area.

In FIG. 8, the mobile terminal 100 may be initially latched to PLMN 001-01, which is a home PLMN of the first simulator 811. This may be performed by changing an MCC and an MNC of the network simulator. After that, when the first simulator 811 is disconnected, a signal is cut off in the mobile terminal 100. Then, when the second simulator 812 using a PLMN 001-02 is switched on, the mobile terminal 100 is also camped on here. After a predetermined time has passed, when the first simulator 811 using the PLMN 001-01 is switched on again, the mobile terminal 100 searches for the home PLMN so as to camp on the PLMN 001-01 again.

Thereafter, both the first simulator 811 and the second simulator 812 are switched off and are then powered on. At this time, a PLMN 001-03 different from the previous one is applied to the first simulator 811. Then a relatively strong signal is output from the first simulator 811 using the PLMN 001-03. At this time, if the mobile terminal 100 is tested to be continuously camped on the second simulator 812 using the PLMN 001-02 rather than the first simulator 811 emitting a strong signal, then it can be said that the network search method according to the present invention is applied.

As described above, in the present invention, a time required to search for and camp on a PLMN for a roaming service can be reduced. In addition, battery consumption for network searching can be further reduced as quickly searching for and camping on a suitable PLMN providing the roaming service is available.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A network access method for a mobile terminal roaming service, the method comprising:
   detecting all failed searches for a last registered Public Land Mobile Network (PLMN), a home PLMN, and PLMNs stored on a Subscriber Identification Module (SIM);
   identifying a roaming area/country corresponding to a current location of a mobile terminal based on information included in PLMNs searched for in a terminal body;
   determining a Radio Communication Access (RAT) for camping based on an optimal RAT previously used when successfully camped on one or more PLMNs in the identified roaming area/country upon trying to camp on; and
   performing roaming by accessing to one of the successfully camped on one or more PLMNs of the identified roaming area/country using the determined RAT.

2. The method of claim 1, wherein the information included in the PLMNs retrieved in the terminal body is at least one of a Mobile Country Code (MCC) and a Mobile Network Code (MNC).

3. The method of claim 1, further comprising:
   checking whether there is a previously camped on PLMN in the identified roaming area/country, and trying to camp on the corresponding PLMN.

4. The method of claim 3, further comprising:
   determining a PLMN to camp on based on a fixed list stored in the terminal body when the last registered PLMN in the identified roaming area/country is unavailable.

5. The method of claim 4, further comprising:
   trying to sequentially camp on PLMNs from a PLMN having a strongest signal strength among the PLMNs searched for in the terminal body when the PLMN determined based on the fixed stored list is unavailable.

6. The method of claim 3, further comprising:
   automatically registering the corresponding PLMN as a preferred PLMN of the identified roaming area/country upon successfully being camped on the last registered PLMN in the identified roaming area/country.

7. The method of claim 3, further comprising:
   checking a list of PLMNs approved for home PLMNs of the identified roaming area/country when the last registered PLMN of the identified roaming area/country is unavailable; and
   attempting to camp on according to a period stored on the SIM using the checked list of the PLMNs.

8. A mobile terminal, comprising:
   a terminal body;
   a wireless communication unit; and
   a controller configured to:
   in response to detecting all failed searches for a last registered Public Land Mobile Network (PLMN), a home PLMN, and PLMNs stored on a Subscriber Identification Module (SIM), control the wireless communication unit to identify a roaming area/country corresponding to a current location of the terminal body based on information included in PLMNs retrieved in the terminal body,
   determine a Radio Communication Access (RAT) for camping based on an optimal RAT previously used when successfully camped on one or more PLMNs in the identified roaming area/country upon trying to camp on, and control the wireless communication unit to access one of the successfully camped on one or more PLMNs in the identified roaming area/country using the determined RAT.

9. The mobile terminal of claim 8, wherein the information included in the PLMNs retrieved in the terminal body is at least one of a Mobile Country Code (MCC) and a Mobile Network Code (MNC).

10. The mobile terminal of claim 8, wherein the controller is configured to control the wireless communication unit to check whether there is a previously camped on PLMN in the identified roaming area/country and try to camp on the corresponding PLMN.

11. The mobile terminal of claim 10, wherein the controller is configured to determine a PLMN to camp on based on a fixed list stored in the terminal body when the last registered PLMN in the identified roaming area/country is unavailable.

12. The mobile terminal of claim 11, wherein the controller is configured to sequentially try to camp on PLMNs from a PLMN having a strongest signal strength among PLMNs searched for in the terminal body when the PLMN determined based on the stored fixed list is unavailable.

* * * * *